(12) United States Patent
Romney

(10) Patent No.: US 7,788,183 B2
(45) Date of Patent: Aug. 31, 2010

(54) APPARATUS, SYSTEM, AND METHOD FOR FACILITATING ELECTRONIC COMMUNICATION BASED ON A PERSONAL CONTACT

(75) Inventor: Todd H. Romney, Sandy, UT (US)

(73) Assignee: The Galt Alliance, Inc, Las Vegas, NV (US)

( * ) Notice: Subject to any disclaimer, the term of this patent is extended or adjusted under 35 U.S.C. 154(b) by 1188 days.

(21) Appl. No.: 11/278,315

(22) Filed: Mar. 31, 2006

(65) Prior Publication Data

US 2006/0235803 A1    Oct. 19, 2006

Related U.S. Application Data

(60) Provisional application No. 60/670,724, filed on Apr. 13, 2005.

(51) Int. Cl.
    G06Q 20/00 (2006.01)
(52) U.S. Cl. ...................................................... 705/65
(58) Field of Classification Search .................. 705/65
    See application file for complete search history.

(56) References Cited

U.S. PATENT DOCUMENTS

| | | | |
|---|---|---|---|
| 5,907,677 A | 5/1999 | Glenn et al. ................. 395/200 |
| 5,920,845 A | 7/1999 | Risemberg ...................... 705/1 |
| 6,249,282 B1 | 6/2001 | Sutcliffe et al. ............. 345/331 |
| 6,298,228 B1 | 10/2001 | Singh ......................... 455/403 |
| 6,480,885 B1 | 11/2002 | Olivier ....................... 709/207 |
| 6,549,768 B1 | 4/2003 | Fraccaroli .................... 455/414 |
| 6,654,768 B2 | 11/2003 | Celik ........................ 707/104.1 |
| 6,665,389 B1 | 12/2003 | Haste, III ................... 379/196 |
| 6,690,918 B2 | 2/2004 | Evans et al. ................ 455/41.2 |
| 6,735,568 B1 | 5/2004 | Buckwalter et al. ............ 705/1 |
| 6,853,979 B1 | 2/2005 | Bass .......................... 705/26 |
| 6,934,739 B2 | 8/2005 | Pietila ....................... 709/207 |
| 7,533,265 B2* | 5/2009 | Ballinger et al. ............. 713/172 |
| 2001/0020239 A1 | 9/2001 | Ukigawa et al. ............ 707/104.1 |
| 2002/0007351 A1* | 1/2002 | Hillegass et al. .............. 705/59 |
| 2002/0029254 A1 | 3/2002 | Davis et al. ................ 709/217 |
| 2002/0165919 A1 | 11/2002 | Pietila ....................... 709/204 |

(Continued)

OTHER PUBLICATIONS

Friendster.com "Press Release" Oct. 18, 2005.

(Continued)

*Primary Examiner*—Pierre E Elisca
(74) *Attorney, Agent, or Firm*—Kunzler Needham Massey & Thorpe

(57) ABSTRACT

An apparatus, system, and method are disclosed for facilitating electronic communication based on a personal contact. A token giver gives a token to a token receiver through a personal contact. The purpose of the token is to facilitate communication between the token giver and token receiver. The token includes a token identifier that is uniquely associated with the token. The apparatus includes a receiver module for receiving the token identifier from the token receiver. In response to receiving the token identifier, a channel module establishes an electronic communication channel between the token giver and the token receiver. A transfer module provides, to the token receiver, initial electronic content customized for the token identifier. In response to a request from either the token receiver or the token giver, a transfer module brokers an electronic content transfer between the token receiver and the token giver via the electronic communication channel.

35 Claims, 6 Drawing Sheets

U.S. PATENT DOCUMENTS

| | | | |
|---|---|---|---|
| 2002/0174188 A1 | 11/2002 | Clark et al. | 709/213 |
| 2002/0194049 A1 | 12/2002 | Boyd | 705/9 |
| 2003/0023558 A1 | 1/2003 | Menninger | 705/51 |
| 2003/0205615 A1 | 11/2003 | Marappan | 235/375 |
| 2004/0088259 A1 | 5/2004 | Celik | 705/50 |
| 2004/0111360 A1 | 6/2004 | Albanese | 705/38 |
| 2004/0220880 A1 | 11/2004 | Stefik et al. | 705/59 |
| 2005/0004873 A1 | 1/2005 | Pou et al. | 705/51 |
| 2005/0004875 A1 | 1/2005 | Kontio et al. | 705/52 |
| 2005/0049972 A1 | 3/2005 | Hsu et al. | 705/53 |
| 2005/0185783 A1 | 8/2005 | Hagebarth | 379/201.02 |
| 2005/0188010 A1 | 8/2005 | Valk | 709/203 |
| 2006/0015728 A1* | 1/2006 | Ballinger et al. | 713/172 |
| 2008/0195499 A1* | 8/2008 | Meredith et al. | 705/26 |

OTHER PUBLICATIONS

Friendster.com "About Friendster" www.friendster.com.
Hi5.com "About hi5.com" www.hi5.com.
Match.com "Startup page" www.match.com.

* cited by examiner

APPARATUS, SYSTEM, AND METHOD FOR FACILITATING ELECTRONIC COMMUNICATION BASED ON A PERSONAL CONTACT

CROSS-REFERENCES TO RELATED APPLICATIONS

This application claims benefit of U.S. Provisional Patent Application No. 60/670,724 entitled "APPARATUS, SYSTEM, AND METHOD FOR NETWORK BASED PERSONAL OR BUSINESS CONTACT, COMMUNICATION, AND PROMOTION" and filed on Apr. 13, 2005 for Todd Romney, which is incorporated herein by reference.

BACKGROUND OF THE INVENTION

1. Field of the Invention

This invention relates to methods of building personal relationships for both personal and commercial purposes and more particularly relates to facilitating electronic communication based on a personal contact.

2. Description of the Related Art

Developing personal relationships is often a socially or professionally rewarding experience. However, initiating contact with a stranger can be a stressful experience, especially for people who are shy or reserved. An initial face to face conversation can be particularly stressful, especially at the beginning of the conversation. At the conclusion of a face to face meeting, two people may be interested in further developing the relationship, but may not be comfortable with giving out personal contact information. Additionally, the personal contact may be very brief. Hence, providing personal contact information may be inconvenient or too time consuming or may be subject to errors in communicating the information during a brief encounter.

This reluctance may be due to a fear that if personal information is disclosed and the relationship does not work out, the person who terminates the relationship may need to deal with harassment by the other party. The reluctance may be attributed to a concern for privacy, convenience, or personal safety.

If the two people happen to meet again, for example because they live, work, or shop in the same geographic area, they may further develop their relationship to the point that they are willing to share personal information such as more specific contact information. However, they will not have this opportunity if they do not meet again. A method of facilitating electronic communication between the two people that allowed for further social exchange without disclosing personal information would assist in overcoming this challenge.

Conventional social networking web sites may assist in facilitating relationships, but they have limitations. For example, a subscriber to a conventional social contact website may create a personal web page including pictures, text, and perhaps video. Other subscribers to the social networking website are able to view the personal web page and initiate contact with the subscriber. However, conventional social networking web sites do not allow the subscriber to customize the content presented to each subscriber so that each person who visits the personal web site sees a customized set of elements such as pictures, text, and video uniquely tailored for each new subscriber. In addition, conventional social networking web sites do not provide resources for establishing a business relationship.

In a business setting, it is beneficial for people to develop personal contacts with potential customers, clients, suppliers, and partners. However people are often pressed for time, and do not take advantage of the opportunity to develop a personal contact when first meeting someone. One may honestly desire to develop a personal contact for business reasons, but may want to do so at a more convenient time or location. For example, a professional at a conference may want to meet others who practice in the same line of work. However he may have a busy schedule during the conference that prevents him/her from taking time to converse with others. In such situations, business cards are typically used to exchange personal information so that future interactions will be possible.

Although business cards provide certain personal information, they are not easily customized for a particular, unique contact. For example, a sales professional may want to provide product information about one product line to a new contact without confusing the contact with product information for another product line. In this example, a business card may provide a URL that the contact may use to view a company website. However, the company website will not be customized for a specific product line. Of course, business cards with different URLs pointing a contact to a particular portion of the web site may be used but such use is often impractical The sales professional may want to further customize information provided to a contact by providing a promotional item or by providing semi-confidential information, such as test results for a new product, that is appropriately shared with certain contacts, but not with others. Websites are not effective in providing such customization because generally anyone can view the content of a website. If the semi-confidential information was posted on the web site, it could be easily obtained by people who might exploit the information. However, to build a relationship with a new contact, it may be advantageous to share the semi-confidential information with the contact. Special login IDs or passwords may be used with secure web pages. However, communicating the login information to each potential contact is difficult.

From the foregoing discussion, it should be apparent that a need exists for an apparatus, system, and method for facilitating electronic communication based on a personal contact. The apparatus, system, and method should ensure that the parties are not required to initially disclose personal information. Additionally, the apparatus, system, and method should provide a method of providing information customized uniquely for a particular personal contact.

SUMMARY OF THE INVENTION

The present invention has been developed in response to the present state of the art, and in particular, in response to the problems and needs in the art that have not yet been fully solved by currently available methods of facilitating electronic communication based on a personal contact. Accordingly, the present invention has been developed to provide an apparatus, system, and method for facilitating electronic communication based on a personal contact that overcome many or all of the above-discussed shortcomings in the art.

The apparatus for facilitating electronic communication based on a personal contact is provided with a logic unit containing a plurality of modules configured to functionally execute the steps of facilitating electronic communication based on a personal contact. These modules in the described embodiments include a receiver module, a channel module, and a transfer module. Preferably, the apparatus includes an account module, a fulfillment module, a notification module, an advertisement module, a token module, and a list module.

The receiver module receives a token identifier from a token receiver. The token identifier is uniquely associated with a token given. A token giver gives the token to the token receiver through a personal contact with the token receiver. The token identifier may comprise a machine-readable code and may be a random value. In one embodiment, the receiver module also receives context information that describes a context for the personal contact.

In one embodiment, the token is either a virtual token or a physical token. In this embodiment, the token comprises the token identifier. In the case of a physical token, the token giver gives the physical token to the token receiver. In the case of a virtual token, the token giver may distribute the virtual token to the token receiver electronically in response to personal contact between the token giver and token receiver. The physical token may be a coin-sized object.

Once the receiver module has received the token identifier, the channel module establishes an electronic communication channel between the token giver and the token receiver. In one embodiment, the electronic communication channel may be either an asynchronous communication channel or a synchronous communication channel.

In one embodiment, if either the token giver or token receiver submits a termination request, the channel module disables the electronic communication channel. In one embodiment, the electronic communication channel restricts disclosure of personal information between the token giver and the token receiver to explicit disclosure of the personal information through the electronic communication channel by either the token giver or the token receiver.

The transfer module brokers an electronic content transfer between the token receiver and the token giver via the electronic communication channel in response to a request from one of the token receiver and the token giver. In one embodiment, the transfer module presents designated portions of the context information that is provided by the token giver to the token receiver. Similarly the transfer module may present designated portions of the context information that is provided by the token receiver to the token giver.

If either the token giver or token receiver submits a termination request, the transfer module may, in one embodiment, reject a request to broker a subsequent electronic content transfer between the token receiver and the token giver. In another embodiment, the transfer module may provide the token receiver with initial electronic content customized for the token identifier.

The initial electronic content may form a profile. The profile includes a set of elements. Each element may have a type such as a number, text, image, audio, video, podcast, web log (blog), Really Simple Syndication (RSS), personal information, promotional code, coupon, web page, file, and the like.

In certain embodiments, the initial electronic content includes a promotion. The promotion is associated with a set of promotion conditions. In this embodiment, the account module debits an account associated with the token giver for the promotion once the token receiver satisfies the promotion conditions. In response, the fulfillment module triggers fulfillment of the promotion for the token receiver. In one embodiment, the promotion includes a free product sample and the set of promotion conditions includes providing personal information.

The notification module notifies the token giver after the receiver module receives the token identifier from the token receiver. The notification module may notify the token giver by sending an email message, a voicemail message, an instant message, a text message, a pager message, a notification icon, or the like. The advertisement module presents an advertising message for a vendor that provided the token to either the token receiver or the token giver.

The token module may, in certain embodiments, automatically exchange portions of context information designated by the token receiver and portions of context information designated by the token giver. In response, the list module populates a token giver contact list with token description information from the token receiver and populates a token receiver contact list with token description information from the token giver.

Another embodiment of an apparatus for facilitating electronic communication based on a personal contact includes an authentication module, a content module, a communication module, and a token exchange module. The authentication module authenticates a token giver. The content module receives a set of selected elements forming a profile from the token giver. The content module associates the profile with initial electronic content for a particular token identifier designated by a token giver. The token identifier is uniquely associated with a token given to a token receiver through a personal contact with the token giver.

The token exchange module receives token exchange information from the token giver. The token exchange information may include a name of the token receiver, a time of token exchange, a date of token exchange, a location of token exchange, a topic of conversation between token giver and token receiver, a photograph of token receiver, or notes from a conversation between token giver and token receiver.

A system of the present invention is also presented for facilitating anonymous electronic communication based on a personal contact. The system, in one embodiment, includes a token receiver client application, an electronic communication utility, a network server, a repository, and a communication network. Preferably, the system includes a token giver client application and a profile utility.

The token receiver client application accepts the token identifier from the token receiver and relays the token identifier to the electronic communication utility. The token receiver client application also presents initial electronic content provided by the electronic communication utility to the token receiver.

The electronic communication utility includes the modules of the first apparatus described above including the receiver module, channel module, and transfer module. Preferably, the reorganization utility includes the account module, fulfillment module, notification module, advertisement module, token module, and list module also described above. The network server hosts the electronic communication utility.

The repository stores a first association between a token identifier and a batch identifier and a second association between the batch identifier and the token giver. The repository provides the first and second associations to the electronic communication utility. The communication network couples the electronic communication utility, token receiver client application, network server, and repository.

The profile utility includes the modules of the second apparatus described above including the authentication module, content module, communication module, and token exchange module. The token giver client application accepts the set of selected elements forming a profile and provides the set to the profile utility.

A method for facilitating electronic communication based on a personal contact is also provided. The method in the disclosed embodiments substantially includes the steps necessary to carry out the functions presented above with respect to the operation of the described apparatus and system.

A token identifier is received from a token receiver. Next, an electronic communication channel is established between the token receiver and token giver. In one embodiment, if the token receiver is a subscriber, the electronic communication utility populates a token giver contact list with token description information of the token giver and a token receiver contact list with token description information of the token giver. Next, an electronic content transfer is brokered between the token giver and token receiver.

Preferably, the token giver is notified that the token identifier has been received. In certain embodiments, an advertising message is presented to either the token giver, token receiver, or both. If a termination request is received from either the token receiver or token giver, the electronic communication utility is disabled.

Another method for facilitating electronic communication based on a personal contact is provided. The method in the disclosed embodiments substantially includes the steps necessary to carry out the functions presented above with respect to the operation of the described apparatus and system.

A token giver is authenticated. Next, a set of selected elements is received from the token giver. The set is provided to the electronic communication utility. In certain embodiments, token exchange information is received from the token giver.

A method for facilitating anonymous electronic communication based on a personal contact is provided. An electronic communication utility is hosted. A token identifier is conveyed from a token receiver to the electronic communication utility. Initial electronic content is conveyed from a token giver to the electronic communication utility. The initial electronic content is provided to the token receiver.

A method for distributing tokens is provided. Tokens and corresponding token identifiers are acquired from a token vendor. The token vendor may be a manufacturer, a token distributor, or a token wholesaler. Each token identifier includes a batch identifier. The batch identifier may be associated with a plurality of tokens. The token's token identifiers are transferred to the token giver. The electronic communication utility receives both a token giver account identifier associated with a token giver and the batch identifier. The electronic communication utility correlates the token giver with the received batch identifier.

The apparatus, system, and method facilitate electronic communication based on a personal contact. The apparatus, system, and method do not require the disclosure of personal information and allow for customizing information for a particular personal contact. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
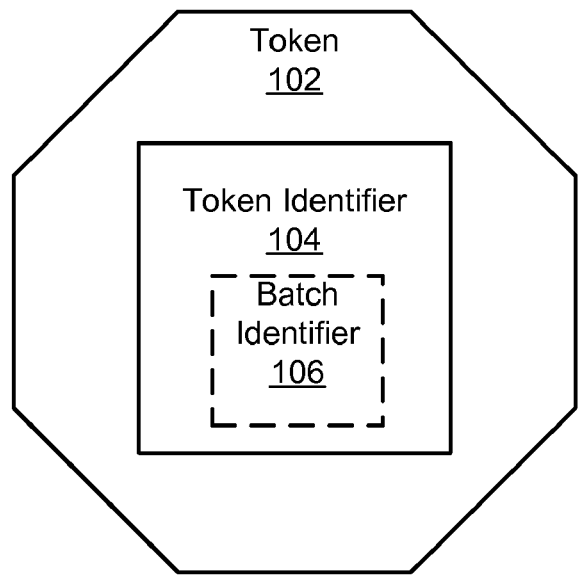
FIG. 1A is a block diagram illustrating one embodiment of a token in accordance with the present invention.

FIG. 1A illustrates one embodiment of a token 102 for use in facilitating electronic communication based on a personal contact. A token giver gives the token 102 to a token receiver with the intent to form a personal or business relationship with the token receiver. A personal contact is a direct contact between a giver and a receiver which occurs due to an affirmative act of the receiver. Typically, a personal contact may be a face to face meeting of two people. However, situations in which the two people do not see each other face to face may also be personal contacts. For example, a token giver may leave a token 102 for a token receiver on the doorstep of the token receiver's home. In this example, the token receiver may know that the token giver is outside the door, and may want to receive the token 102, but may not want to open the door for safety or other reasons. A personal contact may also comprise a situation in which the token giver and token receiver have spoken on the telephone with each other, but have never met face to face.

A personal contact may also be virtual. For example, a personal contact may comprise an email exchange. A personal contact may also comprise a token giver seeing a token receiver's profile published on a web page. For example, a salesman may see a potential customer's name, picture, and email address on a website and choose to send a token 102 to the potential customer. Although the salesman and customer have not met face to face, the salesman's actions may still constitute a personal contact.

In the embodiment depicted in FIG. 1A, the token 102 is a physical token. However, other embodiments may use a virtual token. In the case of a physical token, the token giver gives the physical token to the token receiver. In the case of a virtual token, the token giver may distribute the virtual token to the token receiver electronically in response to personal contact between the token giver and token receiver. The token giver may electronically distribute the virtual token through an email message, text message, short message, instant message, or the like.

The token 102 includes a token identifier 104 that is uniquely associated with the token 102. The token identifier 104 may comprise alphabetic characters, numeric characters, or a combination of alphabetic and numeric characters. In certain embodiments, the token identifier 104 may comprise a machine-readable code, a code that is machine-readable and human readable code, or a strictly human readable code. Furthermore, the token identifier 104 may be a random or semi-random value. It may be advantageous to use a random or semi-random token identifier 104 to prevent a token receiver from predicting one or more other token identifiers 104 based on the token identifier 104 of a token 102 received by the token receiver.

The token identifier 104 may include a batch identifier 106. The batch identifier 106 may be a portion of the token identifier 104. For example, the batch identifier 106 may be the first N characters of the token identifier 104, where N is a number that is less than the total number of characters in the token identifier 104. Alternatively, the batch identifier 106 may be a distinct set of characters, a distinct machine-readable code, or the like. In this embodiment, the distinct identifier comprising the batch identifier 106 is a subset of the token identifier 104.

In one embodiment, the same batch identifier 106 is used for a plurality of tokens. In this embodiment, the token identifier 104 comprises the batch identifier 106 as well as an additional identifier. The additional identifier may be chosen so that it is unique for each of the tokens in a batch. Consequently, each token 102 of the plurality has a unique token identifier 104 comprising a batch identifier 106 common to all tokens within the plurality and an additional identifier unique for that particular token.

The token 102 may be a real or virtual object of any appropriate material and form, including but not limited to an easily portable token, a useful physical object, a decorative physical object, an item of apparel, a toy, an electronic appliance, an electronic signal, and a virtual symbol or object. The token 102 embodiment illustrated in FIGS. 1B and 1C is a roughly coin-sized token, composed of plastic, metal, or other suitable material.

In one embodiment, the token 102 in the form of a physical object comprises a portable object. The portable object token 102 may be sized and shaped to facilitate carrying by a token receiver. The portable object token 102 in certain embodiments comprise any one of a variety of portable items. The portable objects may serve as a token 102, alternatively, or in addition, the portable objects may server as a token 102 and at least one other purpose. The portable object token 102 in certain embodiments comprise any of a variety of items. Examples of the portable object token 102 include, but are not limited to, pens, notepads, letter openers, drink coasters, balloons, water bottles, cards, balls, stuffed animals, stuffed toys, sun glasses, key chains, buttons, bottle openers, mouse pads, magnets, pins, calendars, bags, CDs, and the like. The portable object token 102 may comprise promotional items that are given away. The portable object token 102 may be pocket sized, may include an attachment mechanism for securing the portable physical token to another item. The attachment mechanism may include ties, a snap, a carabineer, a hook, Velcro™, and the like.

Figure 1B:
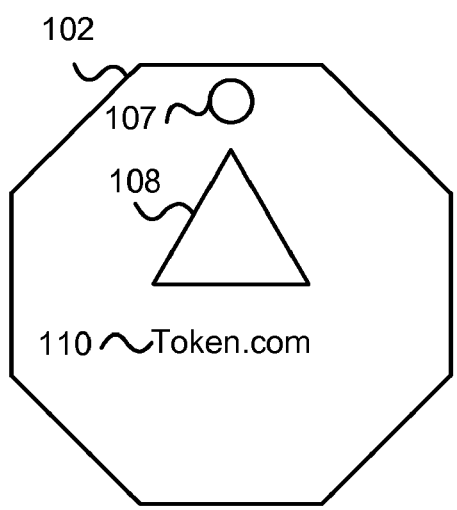
FIG. 1B is a block diagram illustrating a first side of an example token in accordance with the present invention.

FIG. 1B illustrates one side of an embodiment of a token 102. The token 102 includes a Uniform Resource Locator (URL) 110. The URL 110 may be used to access a user interface page associated with the token giver's account. In certain embodiments, the URL 110 may be part of the token identifier 104. The token 102 may include a logo 108 and a hole 107 for attaching the token 102 to a carrying, display, or storage device. The logo 108 may be a logo for the company selling the token 102 or may be a logo chosen by the token giver such as original design, personal logo, trademark, Coat of Arms, or the like.

Figure 1C:
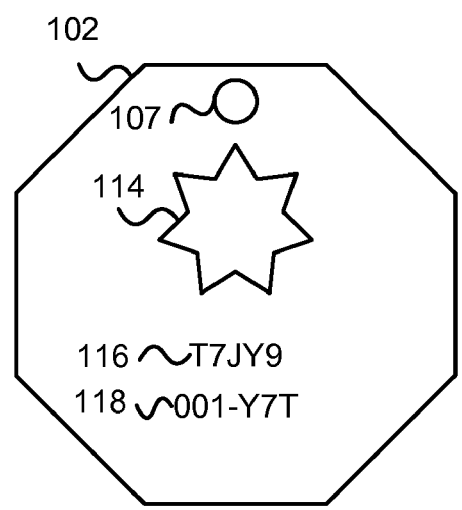
FIG. 1C is a block diagram illustrating a second side of an example token in accordance with the present invention.

FIG. 1C illustrates the opposite side the token 102 illustrated in FIG. 1B. The token 102, in this embodiment, includes two unique alphanumeric identifiers 116, 118 that together comprise a token identifier 104. The first identifier 116 may be a batch identifier 106 that represents an individual account. The second identifier 118 may be the additional identifier, described above, that is unique to a particular token 102. Each identifier may include a combination of numbers, alphanumeric signals, shapes, designs, and representations of objects. Of course, the token identifier 104 may be located on any side of the token 102.

In one embodiment, the batch identifier 106 is selected by the token giver such that it may be a name, number, word, word number combination, or other symbol combination of the giver's choosing. In this embodiment, the token identifier 104 may be printed on a sticker to enable the token giver to create his or her own tokens 102.

In one embodiment, advertisers may pay to have an advertising image 114 such as a trademark or logo printed on the token 102. In a further embodiment, advertisers purchasing such space may receive a portion of the revenue for the sale of the "branded" token 102. In a further embodiment, the advertising image 114 may be an endorsement by sports figures or other celebrities, or may be a logo associated with certain events, such as a fund-raiser, the Olympics, or a school prom.

Figure 2:
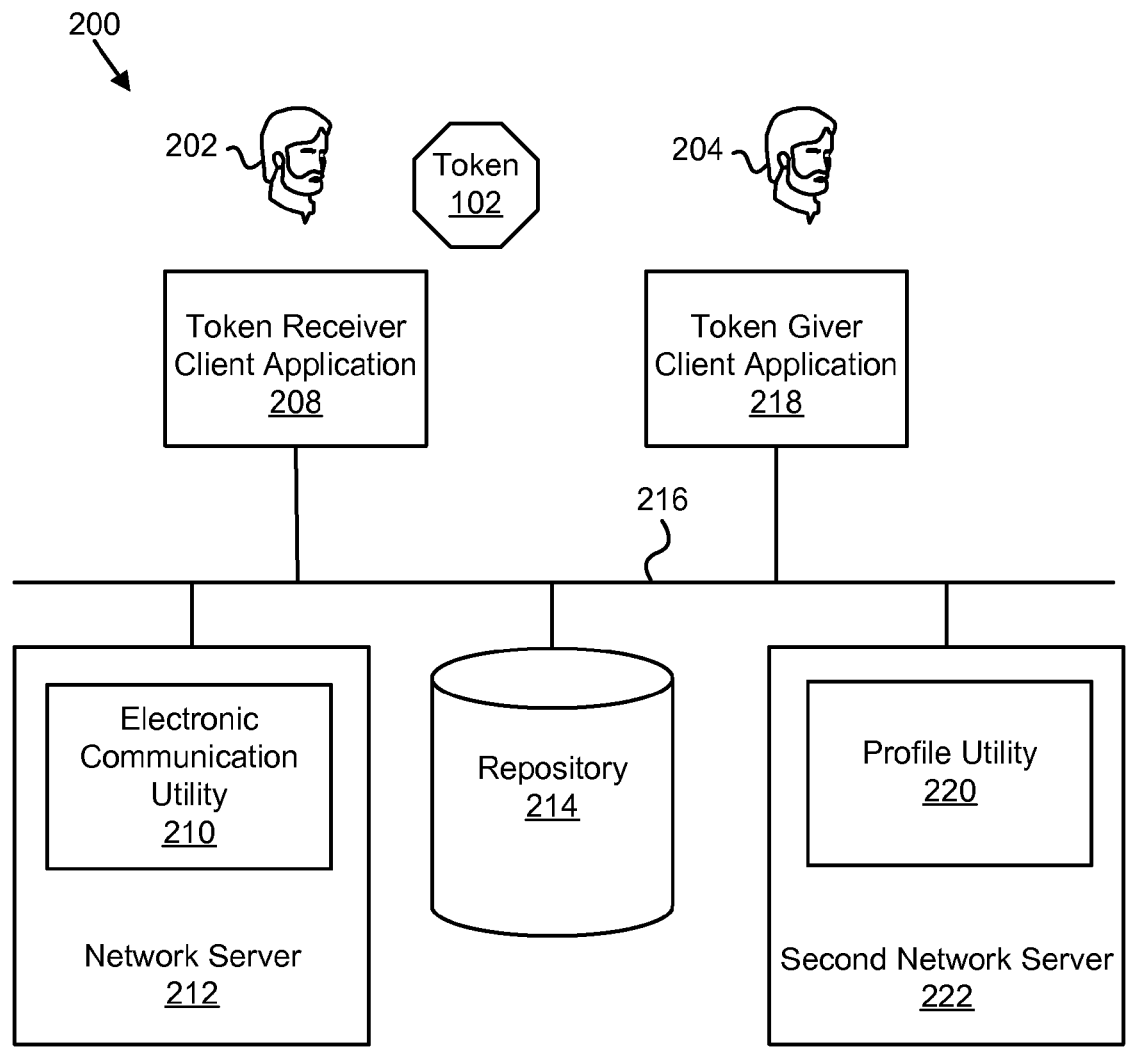
FIG. 2 is a block diagram illustrating one embodiment of a system for facilitating electronic communication based on a personal contact in accordance with the present invention.

FIG. 2 illustrates one embodiment of a system 200 for facilitating anonymous electronic communication based on a personal contact between a token receiver 202 and a token giver 204. The token receiver 202 uses the system 200 to communicate with the token giver 204 after receiving the token 102.

The system 200, in one embodiment, includes a token receiver client application 208, an electronic communication utility 210, a network server 212, a repository 214, and a communication network 216. Preferably, the system 200 includes a token giver client application 218, a profile utility 220, and a second network server 222. Those of skill in the art will recognize that the system 200 may be more simple or complex than illustrated so long as the system 200 includes modules or sub-systems that correspond to those described herein.

The token receiver client application 208 accepts the token identifier 104 from the token receiver 202 and relays the token identifier 104 to the electronic communication utility 210. The token receiver client application 208 also presents initial electronic content provided by the electronic communication utility 210 to the token receiver 202. The token receiver client application 208 may comprise a web browser application that presents and executes code, such as Java, JavaScript, HTML, XML, and the like. Alternatively, the token receiver client application 208 may be a custom application that executes in an operating system such as Windows, Windows Mobile, Linux, UNIX, AIX, Palm OS, MAC OS, and the like. The token receiver client application 208 may execute on a computer, personal digital assistant (PDA), wireless telephone, or other communication or computing device.

The electronic communication utility 210 receives a token identifier 104 from a token receiver 202, wherein the token identifier 104 is uniquely associated with a token 102 given to the token receiver 202 through a personal contact with a token giver 204. The electronic communication utility 210 also establishes an electronic communication channel between the token giver 204 and the token receiver 202 in response to receiving the identifier. Once the electronic communication channel has been established, the electronic communication utility 210 brokers an electronic content transfer between the token receiver 202 and the token giver 204 via the electronic communication channel.

The network server 212 hosts the electronic communication utility 210. In one embodiment, the network server 212 is a web server. The web server may be either a hardware or a software web server and may execute on one or more computers. The network server 212 may employ an operating system, for example, Windows, Linux, UNIX, AIX, and the like.

The repository 214, in one embodiment, stores a first association between a token identifier 104 and a batch identifier 106 and a second association between the batch identifier 106 and the token giver 204. The repository 214 provides the first and second associations to the electronic communication utility 210. The repository 214 may be a database, one or more files, a program, or another data storage device or subsystem. The repository 214 may be located on the network server 212 or may be located on a stand-alone storage device. In certain embodiments, the repository 214 may be a redundant set of data storage devices that ensure that the repository 214 is not lost due to a failure of a data storage device. In other embodiments, the repository 214 and electronic communication utility 210 may be part of the same software application.

The communication network 216 couples the electronic communication utility 210, token receiver client application 208, network server 212, and repository 214 so as to allow communication between these elements. The communication network 216 may be a bus, a wired network, a wireless network, or other connective communication technology. The communication network 216 may employ the use of multiple, layered communication protocols including Ethernet, Internet Protocol (IP), Asynchronous Transfer Mode (ATM), Time Division Multiplexing (TDM), Peripheral Communication Interface (PCI), Small Computer System Interface (SCSI), and the like.

The system 200 may, in certain embodiments, also include a token giver client application 218, a profile utility 220, and a second network server 222. In these embodiments the communication network 216 enables communication between the token receiver client application 208, network server 212, repository 214, token giver client application 218, profile utility 220, and second network server 222.

The token giver client application 218 accepts a set of selected elements forming a profile from the token giver 204 and provides the set to the profile utility 220. An element is a form of communicating information from one person to another. Typically, the element represents the format for the information and the token giver 204 supplies the content for the element. Consequently, a selected element is a type of information formatting selected by a user which the user desires to communicate within the profile. The selected elements that form the profile may have a type such as a number, text, image, audio, video, podcast, web log (blog), Really Simple Syndication (RSS), personal information, promotional code, coupon, web page, file, and the like. The profile formed by the selected elements may be one or more web pages. For example, a token giver 204 may create a profile comprising a web page that includes the token giver's name (a text element), a picture of the token giver 204 (an image element), a diary of the token giver's recent activities (a blog element), and a welcome message (an audio element). The token giver 204 creates the profile using the token giver client application 218.

The token giver client application 218 may comprise a web browser application that presents and executes code, such as Java, JavaScript, HTML, XML, and the like. Alternatively, the token giver client application 218 may be a custom application that executes in an operating system such as Windows, Windows Mobile, Linux, UNIX, AIX, Palm OS, MAC OS and the like. The token giver client application 218 may execute on a computer, personal digital assistant (PDA), wireless telephone, or other communication or computing device.

The profile utility 220 authenticates a token giver 204 and receives a set of selected elements from the token giver 204. The set of elements form a profile. The token giver 204 may choose to use the profile as initial electronic content for a particular token identifier 104 or set of particular token identifiers 104. Once the profile utility 220 has received the set of elements, the profile utility 220 provides the selected elements to the electronic communication utility 210. The profile utility 220 and electronic communication utility 210 may, in certain embodiments, be part of the same software application.

The second network server 222 hosts the profile utility 220. In one embodiment, the second network server 222 is a web server. The web server may be either a hardware or software web server and may execute on one or more computers. The second network server 222 may employ an operating system, for example, Windows, Linux, UNIX, AIX, and the like. In embodiments with a second network server 222, the network server 212 and second network server 222 need not be in the same physical location. In certain embodiments, the second network server 222 is unnecessary because the profile utility 220 is hosted by the same network server 212 that hosts the electronic communication utility 210.

Figure 3A:
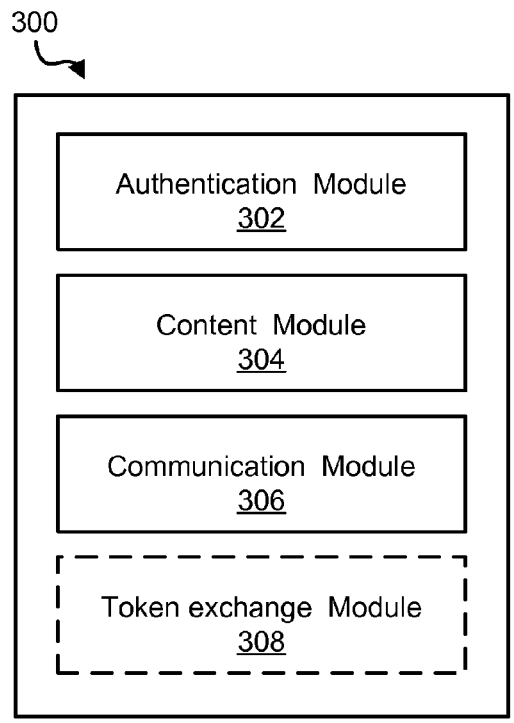
FIG. 3A is a block diagram illustrating one embodiment of an apparatus for facilitating electronic communication based on a personal contact in accordance with the present invention.

FIG. 3A illustrates one embodiment of an apparatus 300 for facilitating electronic communication based on a personal contact. Preferably, the apparatus 300 is configured to function in substantially the same manner as the profile utility 220 described above in relation to FIG. 2. The apparatus 300 includes an authentication module 302, a content module 304, and a communication module 306. Preferably, the apparatus 300 also includes a token exchange module 308.

The authentication module 302 authenticates a token giver 204 before allowing further communication between the token giver 204 and the apparatus 300. The authentication module 302 may use an authentication scheme known to those of skill in the art to authenticate the token giver 204. For example, the authentication module 302 may require a user name and password from the token giver 204. Alternatively, the authentication module 302 may require an account number or unique identifier.

The authentication module 302 may use an encryption technique well known to those of skill in the art to encrypt information sent by the token giver 204 so that the information is protected against interception. Preferably, the token giver 204 provides information required by the authentication module 302 to the token giver client application 218 which forwards the information to the authentication module 302. The token giver client application 218 may encrypt the information before forwarding it to the authentication module 302.

Once the token giver 204 has been authenticated by the authentication module 302, the content module 304 receives a set of selected elements. The content module 304 may receive the set directly from the token giver 204 or from the token giver client application 218. The content module 304 associates the received set with the token giver 204. The content module 304 may also additionally associate the received set with a particular token identifier 104.

A selected element is a piece of information that is used to build a profile. Each element may have a type such as a number, text, image, audio, video, podcast, web log (blog), Really Simple Syndication (RSS), personal information, promotional code, coupon, web page, file, and the like. The token giver 204 designates an arrangement of the elements to form a profile. The profile may be one or more web pages, where each web page includes one or more elements. For example, the profile may be a web page containing text, audio, video and images.

The token giver 204 may create a unique profile for each token 102. Typically, the token giver 204 distributes a token 102 to a token receiver 202. The token giver 204 may note the token identifier 104 of the token 102 given to the token receiver 202. The token giver 204 then creates a profile customized for the token receiver 202 comprising a set of elements that the token giver 204 selects specifically for the token receiver 202. Alternatively, the token giver 204 may define a profile by selecting a set of elements and providing the set to the content module 304 prior to distributing the token 102.

For example, a token giver 204 may meet a token receiver 202 at a party and give the token receiver 202 a token 102. The token giver 204 may then create a profile for the token identifier 104 of the token 102 given to the token receiver 202 that includes image elements (pictures of the party), a blog element (a description of the party), and a text element (an invitation for the token receiver 202 to attend another party with the token giver 204). The token giver 204 customizes the profile for the token receiver 202 by selecting pictures that the token receiver 202 is likely to be interested in viewing and by creating a personal invitation in the text element.

For example, the token giver 204 may be an antiques dealer at a trade show who meets many potential customers. The dealer may have a discussion with a particular customer about some antique tables that he has not brought to the show, but that nevertheless are available for sale. The dealer may wish to provide pictures of the antique tables for the customer.

To facilitate further communication, the dealer may give the customer a token 102. The dealer then notes the unique token identifier 104 of the token 102 given to the customer 102 and then creates a profile customized for the customer. The profile may include photographs of the antique tables he has for sale, the dealer's contact information such as name, address, and phone number, and a coupon to entice the customer to buy from the dealer. The dealer then provides the customized profile to the content module 304.

This customized profile has the potential of being much more effective than a general website because the dealer has incorporated information that is useful to a particular customer in the profile. The customized profile saves the customer time since she may access information that she is interested in (the pictures of the tables) directly through the customized profile without having to search through information that she may not be interested in as would be required with a generic website.

The customized profile is also helpful to the dealer. The customized profile allows him to decide on a per customer basis whether or not to include a coupon and what the amount of the coupon should be. For example, the dealer may decide to restrict coupons to customers that he believes are serious buyers.

In one embodiment, the token giver client application 218 enables the token giver 204 to create a general profile containing elements that he will want to include in most customized profiles. For example, if the token giver 204 is a sales professional, she may want to include an image element of her company trademark, a text element containing her contact information, and an image element illustrating her product. The general profile may also include a desired color scheme and desired element arrangement.

The token giver 204 may then customize this general profile for a particular token identifier 104 by simple editing a text element to provide a personalized message for the token receiver. The general profile reduces the amount of time required for the token giver 204 to customize a profile for a particular token identifier 104. Of course, the token giver 204 may create multiple general profiles. Alternatively, the token content module 304 may provide one or more pre-built general profiles that the token giver 204 may modify.

Typically, the token giver 204 creates the set of elements for the profile using the token giver client application 218. The token giver client application 218 then relays the set of elements forming a profile and the associated token identifier 104 to the content module 304. The content module 304 may also search the contents of the repository 214 to verify that the token identifier 104 for which the token giver 204 has submitted the set of elements is associated with the token giver 204.

Once the content module 304 has received the set of elements, the communication module 306 sends the set of elements and associated token identifier 104 to the electronic communication utility 210. The content module 304 may send this information in a number of ways. For example the information may be sent by placing it in a file or table where the electronic communication utility 210 can access the information. The content module 304 may also send the information through an application programming interface (API). Alternatively, the content module 304 may use a method of electronic communication known to those of skill in the art such as a bus, a network, an API, a function call, a file, a stream, a feed, web services, or the like.

In certain embodiments, the apparatus 300 includes a token exchange module 308. The token exchange module 308 receives token exchange information from the token giver 204. The token exchange information may include a name of the token receiver 202, a time of token exchange, a date of token exchange, a location of token exchange, a topic of conversation between token giver 204 and token receiver 202, a photograph of token receiver 202, or notes from a conversation between token giver 204 and token receiver 202.

The token exchange information is helpful because it reminds the token giver 204 of the circumstances surrounding the distribution of a particular token 102. The token giver 204 typically provides token exchange information to the token giver client application 218 which relays the token exchange information to the token exchange module 308. The token exchange information may be used exclusively by the token giver 204 as a reminder and is not shared with the token receiver 202. The token giver 204 may retrieve token exchange information as needed using the token identifier 104. However, in certain embodiments, the token giver 204 may choose to share the token exchange information with the token receiver 202 by including the token exchange information in the set of elements forming a profile for the token receiver 202.

Figure 3B:
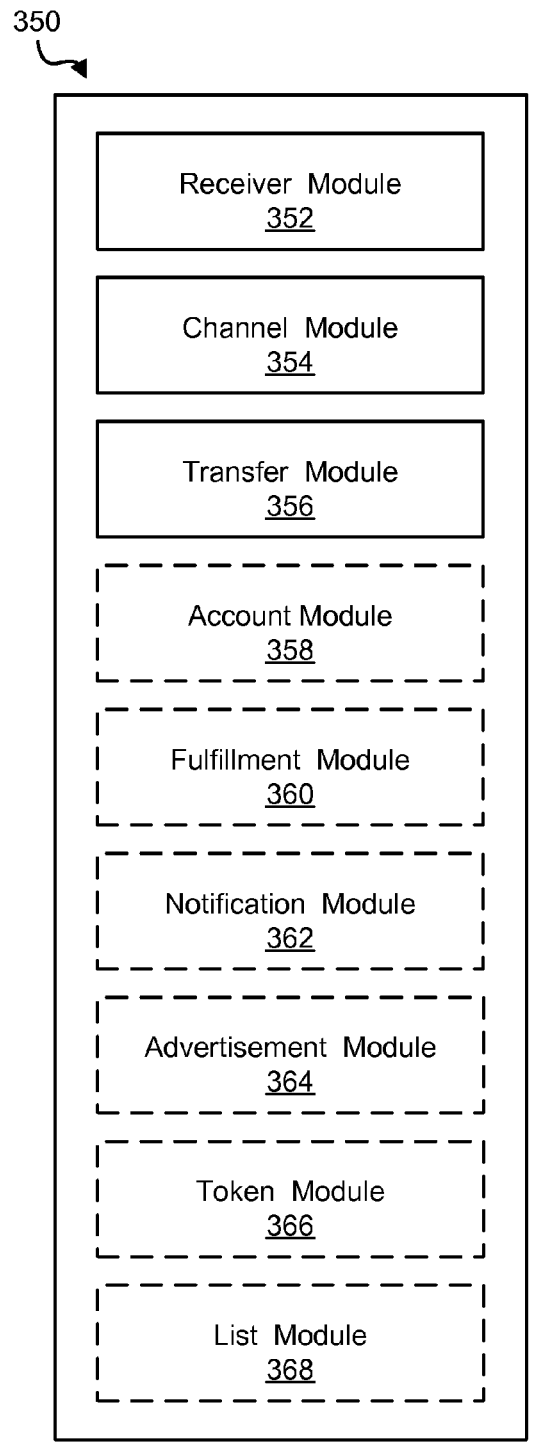
FIG. 3B is a block diagram illustrating one embodiment of an apparatus for facilitating electronic communication based on a personal contact in accordance with the present invention.

FIG. 3B illustrates one embodiment of an apparatus 350 for facilitating electronic communication based on a personal contact. Preferably, the apparatus 350 is configured to serve as the electronic communication utility 210 described above in relation to FIG. 2. The apparatus 350 includes a receiver module 352, a channel module 354, and a transfer module 356. Preferably, the apparatus 350 also includes an account module 358, a fulfillment module 360, a notification module 362, an advertisement module 364, a token module 366, and a list module 368.

The receiver module 352 receives a token identifier 104 from a token receiver 202. The token identifier 104 is uniquely associated with a token 102 given to the token receiver 202 by a token giver 204 through a personal contact with the token receiver 202. Preferably, the token receiver 202 enters the token identifier 104 in the token receiver client application 208 and the token receiver client application 208 relays the token identifier 104 to the receiver module 352. In this embodiment, the token receiver client application 208 may be a web browser operated by the token receiver 202 that displays a web page. The web page may have a blank entry box where the token receiver 202 enters the token identifier 104. The token receiver 202 may know which web page to call up by using a URL 110 located on the token 102.

In one embodiment, the receiver module 352 compares the received token identifier with a set of token identifiers stored in the repository 214 to determine if the received token identifier is known to the apparatus 350. If the received token identifier is not found in the repository 214 the receiver module 352 may present a message to the token receiver 202 informing the token receiver 202 that he or she has entered an invalid token identifier 104.

If the received token identifier is found in the repository 214 the receiver module 352 may determine the token giver 204 associated with the received token identifier based on the first and second associations stored by the repository 214.

In one embodiment, the token receiver client application 208 may automatically read a token identifier 104 comprising a machine-readable code. For example, the token identifier 104 may be stored on persistent or non-persistent-storage media such as a USB drive, flash drive, floppy disk, data card, memory card, hard drive, and the like. In this embodiment, the token receiver client application 208 reads the token identifier 104 directly from the storage media. This minimizes the effort required of the token receiver 202 by eliminating the need for the token receiver 202 to manually enter the token identifier 104. Of course, the machine-readable code may be encrypted for security purposes using encryption techniques well known to those of skill in the art.

In another embodiment, the receiver module 352 may automatically read a token identifier 104 from a virtual token 102. For example, the virtual token 102 may be an email message or instant message containing a URL that includes a token identifier 104. In this embodiment, the token receiver 202 may click on the URL that includes a token identifier 104. Consequently, the receiver module 352 "receives" the token identifier 104 in this case, by receiving a request from the token receiver 202 to open a URL associated with the particular token identifier 104.

In one embodiment, the receiver module 352 also receives context information from the token receiver 202. The context information describes the context in which the personal contact that resulted in the distribution of the token 102 took place. For example, context information may be "2006 Trade Show—Antiques Booth" or "Apr. 1, 2006 Party."

The context information may comprise a label associated with the token identifier and assists the token receiver 202 in remembering how he or she met the token giver 204. The context information may also comprise personal information such as the token receiver's name, phone number, email address, and the like.

Typically, the token receiver 202 enters the context information in the token receiver client application 208. The token receiver 202 may designate, within the token receiver client application 208, portions of the context information that may be shared with the token giver 204. For example, the context information may comprise a plurality of fields on a web page presented by the token receiver client application 208. In this example, the token receiver 202 may designate which of the fields of the token description information are to be shared by clicking a checkbox next to the field. The token description information may include context information For example, the token receiver 202 may choose to include her name, the date and place of the token transfer, and first impressions of the token giver 204 in the context information. The token receiver 202 may choose to designate particular portions of the context information that she is willing to share with the token giver 204. For example, the token receiver 202 may choose to designate her name as a portion of the context information to be shared with the token receiver 204. The token receiver client application 208 relays the designated portions of the context information to the receiver module 352.

Alternatively, the receiver module 352 may receive context information from the token giver 204 via the token giver client application 218. The token giver 204 may designate, within the token giver client application 218, portions of the context information that may be shared with the token receiver 202.

Once the receiver module 352 has received the token identifier 104, the channel module 354 establishes an electronic communication channel between the token giver 204 and the token receiver 202. The electronic communication channel is an exclusive channel between the token giver 204 and token receiver which preserves anonymity of the sender and the receiver and provides no way to determine the source user or destination user of communication messages. In one embodiment, the electronic communication channel is an asynchronous communication channel. In general, asynchronous channels allow the one party to send content through the channel that the receiving party may retrieve at sometime in the future independent of the time the message is sent.

For example, the channel may comprise a web page on which the token giver 204 may post pictures. The web page is configured such that only the token receiver 202 may view the web page. Another example of an asynchronous channel is a channel that allows text messages to be sent from the token giver 204 to the token receiver 202 and from the token receiver 202 to the token giver 204.

In another embodiment, the electronic communication channel is a synchronous communication channel. In general, synchronous channels convey content from one party to another at a particular time. To effectively communicate using a synchronous channel, a receiving party needs to process a message (such as spoken words or text) shortly after the message is sent by a sending party because the message is time sensitive and may not be stored for future retrieval. For example, a synchronous channel may comprise a voice over IP (VOIP) channel that enables real-time voice communication between the token giver 204 and token receiver 202. In this example, the channel is synchronous because the token giver 204 and token receiver 202 both use the channel at the same time in order for the communication to be meaningful. For the communication to be effective, the token receiver 202 should be listening on the channel while the token giver 204 is speaking. Instant messaging is another example of one form of a synchronous communication channel.

Of course, the channel module 354 may establish more than one electronic communication channel between the token giver 204 and the token receiver 202 simultaneously.

For example, the channel module 354 may establish a channel that allows for posting of pictures (an asynchronous channel) and another channel that allows for a real-time voice or chat conversation (synchronous channel).

The transfer module 356 brokers electronic content transfers between the token receiver 202 and the token giver 204 via the electronic communication channel. An electronic content transfer is a transfer of one or more elements from the token giver 204 to the token receiver 202 or from the token receiver 202 to the token giver 204. An element, as described above may be a number, text, image, audio, video, podcast, web log (blog), Really Simple Syndication (RSS), personal information, promotional code, coupon, web page, file, and the like.

The transfer module 356 enables communication between the token giver 204 and the token receiver 202 over the electronic communication channel while preventing others from participating in the communication. Consequently, the transfer module 356 preserves anonymity of the sender and the receiver and provides no way to determine the source user or destination user of communication messages.

In one embodiment, if either the token giver 204 or token receiver 202 submits a termination request to the transfer module 356, the transfer module 356 disables the electronic communication channel. This feature allows either the token giver 204 or the token receiver 202 to unilaterally cease electronic communications. Alternatively, the token receiver 202 may choose not to view either the initial electronic content provided by the token giver 204 or subsequent electronic content transfers provided by the token giver 204.

For example, if the initial electronic content comprises a web page, the token receiver 202 may choose not to view the web page after providing the token identifier 104. The token receiver 202 may further decide not to visit the web page in the future after initially providing the token identifier 104. In the mean time, the token giver 204 may add new content to the web page. However, by deciding not the visit the web page, the token receiver 202 will not view the new content. In this manner, the token receiver 202 has effectively ceased communication with the token giver 204 without having to disable the electronic communication channel.

For example, suppose a man meets a woman at a social event and gives her a token 102. The woman may choose to utilize the apparatus 350 by providing the token identifier 104 on the token 102 to the receiver module 352. Consequently, the channel module 354 will establish an electronic communication channel between the man and the woman.

The man may choose to send text messages through the channel to the woman, or he may choose to initiate a VOIP telephone conversation with the woman. If the woman decides that she is no longer interested in communicating with the man, she may send a termination request to the transfer module 356 via the token receiver client application 208. As a result, the transfer module 356 will disable the electronic communication channel thereby preventing the man from continuing electronic communication with the woman.

The transfer module 356, in another embodiment, restricts disclosure of personal information between the token giver 204 and the token receiver 202 to explicit disclosure of the personal information through the electronic communication channel by either the token giver 204 or the token receiver 202. For example, the apparatus 350, may have personal information about either the token giver 204 or the token receiver 202 including contact information such as email address, phone number, address, name, birth date, or a personal identification number. The apparatus 350 may use this information when billing the token giver 204 or token receiver 202 for services rendered by the apparatus 350.

However, even though the apparatus 350 may have access to this personal information, the transfer module 356 does not permit disclosure of the personal information. Consequently, the token giver 204 and token receiver 202 may communicate through an electronic communication channel established by the channel module 354 without ever knowing each other's name, email address, phone number, etc. This is true for both synchronous and asynchronous channels. For example, a VOIP telephone call could be established through the channel without either party knowing each other's phone number. This anonymous electronic communication channel is advantageous because it allows someone to begin a relationship knowing that he/she can terminate the relationship without fear that the other person will retaliate by using her personal information to continue to contact or otherwise harass them.

Of course, either the token giver 204 or the token receiver 202 could choose to disclose personal information directly through the electronic communication channel. For example, the token giver 204 could choose to send an address through a text message to the token receiver 202 via a text message through the channel, or the token receiver 202 could choose to disclose her phone number in a video clip posted through the channel.

The channel module 354 may perform configuration steps needed to establish the channel. The type of channel and the types of elements available on the channel may be controlled by configuration settings for the token giver 204, token receiver 202, or technical requirements. For example, the token receiver 202 may be using a communication device that does not have sound capability or does not have a display. Consequently, the channel module 354 may adapt the channel to the technical limits of the token giver 204 or token receiver 202. Alternatively, configuration settings of the token giver 204 or the token receiver 202 may permit only certain types of information to be exchanged such as text only or audio only. Consequently, the channel established by the channel module 354 may impose those desired limitations. Of course, the channel module 354 may lift certain restrictions in response to changes in the configuration information for the token giver 204 or the token receiver 202. In this manner, either a token receiver 202 or a token giver 204 can expand the richness of the communication channel as his/her comfort level improves regarding the token receiver 202 or a token giver 204 on the other end.

In one embodiment, the transfer module 356 serves as a "middleman" relaying information submitted by the token receiver 202 to the token giver 204 through either the electronic communication channel. For example, the transfer module 356 may relay context information received from the token receiver 202 to the token giver 204. Of course, if either the token giver 204 or token receiver 202 submits a termination request, the transfer module 356 may, in one embodiment, reject a request to broker a subsequent electronic content transfer between the token giver 204 and the token receiver 202.

The transfer module 356 may also provide initial electronic content corresponding to the token identifier 104 to the token receiver 202. The initial electronic content is content that the token giver 204 has customized for a particular token identifier 104. The initial electronic content may comprise a profile. A profile, as described above in relation to FIG. 3B, is a set of one or more elements such as a number, text, image, audio, video, podcast, web log (blog), Really Simple Syndication (RSS), personal information, promotional code, coupon, web page, file, and the like.

Typically, the initial electronic content is the first thing that the token receiver 202 sees after entering the token identifier 104 in the token receiver client application 208. The transfer module 356 provides the initial electronic content to the token receiver client application 208. The token receiver 202 may choose to send the token giver 204 a subsequent message in the form of one of the elements described above (text, image, audio, etc.). The transfer module 356, in one embodiment, receives the subsequent message via the token receiver client application 208.

If the token giver 204 is currently using a token giver client application 218, the transfer module 356 may relay the subsequent message directly to the token giver client application 218. Alternatively, if the token giver 204 is not currently using a token giver client application 218, the transfer module 356 may store the subsequent message and relay the subsequent message to the token giver 204 once he starts using a token giver client application 218.

In another embodiment, the transfer module 356 may enable the token giver client application 218 and token receiver client application 208 to communicate directly with each other instead of relaying messages through the transfer module 356. In this embodiment, the transfer module 356 may provide addressing information, such as an Internet Protocol (IP) address, to the token giver client application 218 and token receiver client application 208.

In certain embodiments, the initial electronic content includes a promotion. The promotion may be associated with a set of promotion conditions. For example, the promotion may be a free product sample and the promotion condition may be that the token receiver 202 provide his/her home address so that the token giver 204 can send him/her printed advertising through the mail in the future.

In this embodiment, the account module 358 debits an account associated with the token giver 204 for the promotion once the token receiver 202 satisfies the promotion conditions. In the above example, once the token receiver 202 provides his/her home address the promotion condition is satisfied. In this example, the account module 358 then debits an account associated with the token giver 204 by recording the quantity and type of product sample given away. The account module 358 may also record a dollar value associated with the product sample.

Alternatively, the token receiver 202 may not satisfy the promotion conditions. In this example the token giver's account will not be debited. This is an advantageous manner to distribute promotional items since the token giver 204, typically a salesperson, will be debited for token receivers 202 that are willing to satisfy the promotion conditions instead of distributing promotional items to all potential customers, even those who are not that interested.

The account may be used by an external accounting system to bill the token giver 204 for the product sample or merely to keep track of how many samples a token giver 204 has given away. The account may be a file, a variable, a database, or the like. The account need not be an actual bank account.

In response to the satisfaction of the promotion conditions, the fulfillment module 360 triggers fulfillment of the promotion for the token receiver 202. For example, the fulfillment module 360 may send a message to an external order entry system instructing the order entry system to ship a product sample to the token receiver 202. The message that the fulfillment module 360 sends may be a message well known to those of skill in the art such as a function call, a file, an API call, an email message, a text message, and the like.

In certain embodiments, the notification module 362 notifies the token giver 204 after the receiver module 352 receives the token identifier 104 from the token receiver 202. The notification informs the token giver 204 that the token receiver 202 has accessed, and presumably viewed, the initial electronic content associated with the token identifier 104.

The notification module 362 may notify the token giver 204 by a method well known to those of skill in the art including sending an email message, a voicemail message, an instant message, a text message, a pager message, a notification icon, or the like. The notification icon may pop-up on a desktop window. Additionally, the notification module 362 may send a notification to the token giver 204 or token receiver 202 when the transfer module 356 stores new content that has not yet been presented to the token giver 204 via the token giver client application 218 or to the token receiver 202 via the token receiver client application 208.

In certain embodiments, the apparatus 350 includes an advertisement module 364. The advertisement module 364 presents an advertising message either to the token giver 204 via the token giver client application 218 or to the token receiver 202 via the token receiver client application 208. The advertising message may be from a vendor that provided the token 102, or from another vendor such as the token giver 204. The advertising message may be in the form of one of the elements describes above such as text, image, audio, video, podcast, web log (blog), Really Simple Syndication (RSS), promotional code, coupon, web page, file, and the like.

In certain situations, both the token giver 204 and the token receiver 202 may be subscribers to the services that the apparatus 350 provides. Normally, the token receiver 202 may not be a subscriber to the services. However, if the token receiver 202 in a particular situation is a person that has his/her own tokens 102 that he/she distributes as a token giver 204, he/she will likely be a subscriber. In this situation, the token module 366 may automatically exchange token description information from the token giver 204 and token description information from the token receiver 202.

The token description information, as described above, is information that includes detailed information about the token. The token description information may include context information, contact information, subscriber user name information, and the like.

In response to the exchange of token description information performed by the channel module 354, the list module 368 populates a token giver contact list with the token description information from the token receiver 202 and populates a token receiver contact list with the token description information from the token giver 204. These lists may be stored by the apparatus 350. The token giver contact list may be accessed using the token giver client application 218 and the token receiver contact list may be accessed using the token receiver client application 208. The token giver 204 or token receiver 202 may use the token description information in the contact lists to contact each other later.

Exchanging token description information is advantageous because it allows the token receiver 202 to initiate communication with the token giver 204 using token description information from the token receiver contact list in the token receiver client application 208 instead of having to enter the token identifier 104 or other token description information, which may be an arbitrary number that is easily forgotten or lost.

Figure 4:
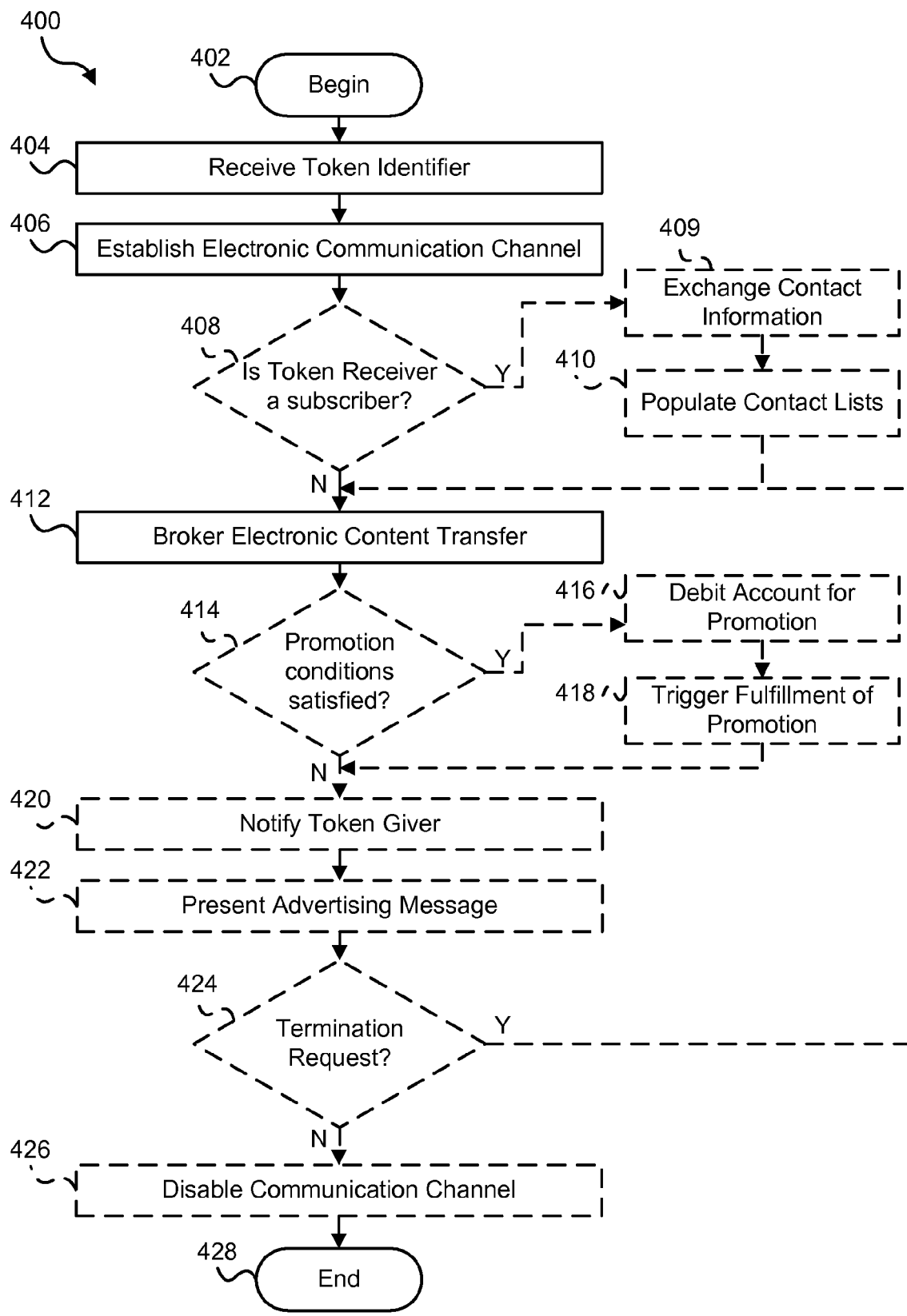
FIG. 4 is a flow chart diagram illustrating one embodiment of a method for facilitating electronic communication based on a personal contact in accordance with the present invention.

FIG. 4 is flow chart diagram illustrating one embodiment of a method 400 for facilitating electronic communication based on a personal contact. Preferably, the method 400 is implemented in a conventional system by modifying computer readable code to implement the apparatus 350 described above.

The method 400 begins 402 when the receiver module 352 receives 404 a token identifier 104 from a token receiver 202. As discussed above in relation to FIG. 3B, a token receiver client application 208 may relay the token identifier 104 to the receiver module 352. Next, the channel module 354 establishes 406 an electronic communication channel between the token receiver 202 and the token giver 204. The channel module 354 may establish both synchronous and asynchronous channels.

Preferably, a determination 408 is made as to whether the token receiver 202 is a subscriber. If the token receiver 202 is a subscriber, the token module 366 automatically exchanges 409 token description information between the token giver 204 and the token receiver 202. Next, preferably the list module 368 populates 410 a token giver contact list with the token description information of the token receiver 202 and populates a token receiver contact list with the token description information of the token giver 204.

The transfer module 356 then brokers 412 an electronic content transfer between the token giver 204 and token receiver 202. As discussed above, the transfer module 356 may provide initial electronic content that has been customized for the token identifier 104 to the token receiver 202.

In one embodiment, a promotion is employed. A determination 414 is made as to whether the token receiver 202 has met the promotion conditions. If the promotion conditions are met, an account module 358 may debit 416 the account of the token giver 204 as discussed above in relation to FIG. 3B. Additionally, a fulfillment module 360 triggers 418 fulfillment of the promotion for the token receiver 202.

Next, if there is no promotion, or if there is a promotion and the fulfillment of the promotion has been triggered, a notification module 362 notifies 420 the token giver 204 that the receiver module 352 has received the token identifier 104 from the token receiver 202. In certain embodiments, the notification module 362 also notifies 420 the token giver 204 when there is new content stored by the transfer module 356 that has not yet been presented to the token giver 204 via the token giver client application 218.

Preferably, an advertisement module 364 presents 422 an advertising message either to the token giver 204 via the token giver client application 218 or to the token receiver 202 via the token receiver client application 208.

A determination 424 is made as to whether a termination request has been received from either the token giver 204 or the token receiver 202. If a termination request has been received, the channel module 354 disables 426 the electronic communication channel and the method 400 ends 428. If a termination request has not been received, the method 400 continues to broker 412 electronic content transfers between the token giver 204 and token receiver 202.

Figure 5A:
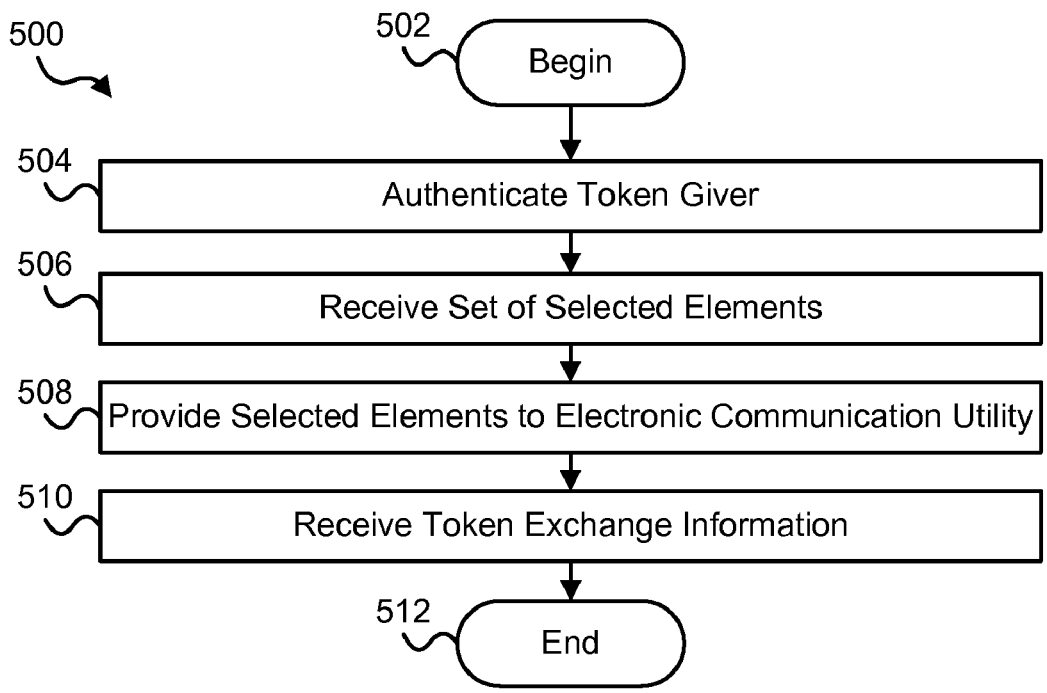
FIG. 5A is a flow chart diagram illustrating one embodiment of a method for facilitating electronic communication based on a personal contact in accordance with the present invention.

FIG. 5A is flow chart diagram illustrating one embodiment of a method 500 for facilitating electronic communication based on a personal contact. Preferably, the method 500 is implemented in a conventional system by modifying computer readable code to implement the apparatus 300 described above.

The method 500 begins 502 when the authentication module 302 authenticates 504 a token giver 204. The content module 304 then receives 506 a set of selected elements forming profile. Typically, the set is sent by the token giver 204 via the token giver client application 218. Next, the communication module 306 provides 508 the set of selected elements to the electronic communication utility 210.

Preferably, the token exchange module 308 receives 510 token exchange information from the token giver 204. Typically, the token giver 204 provides token exchange information to the token giver client application 218 which relays the token exchange information to the token exchange module 308. The method 500 ends 512.

Figure 5B:
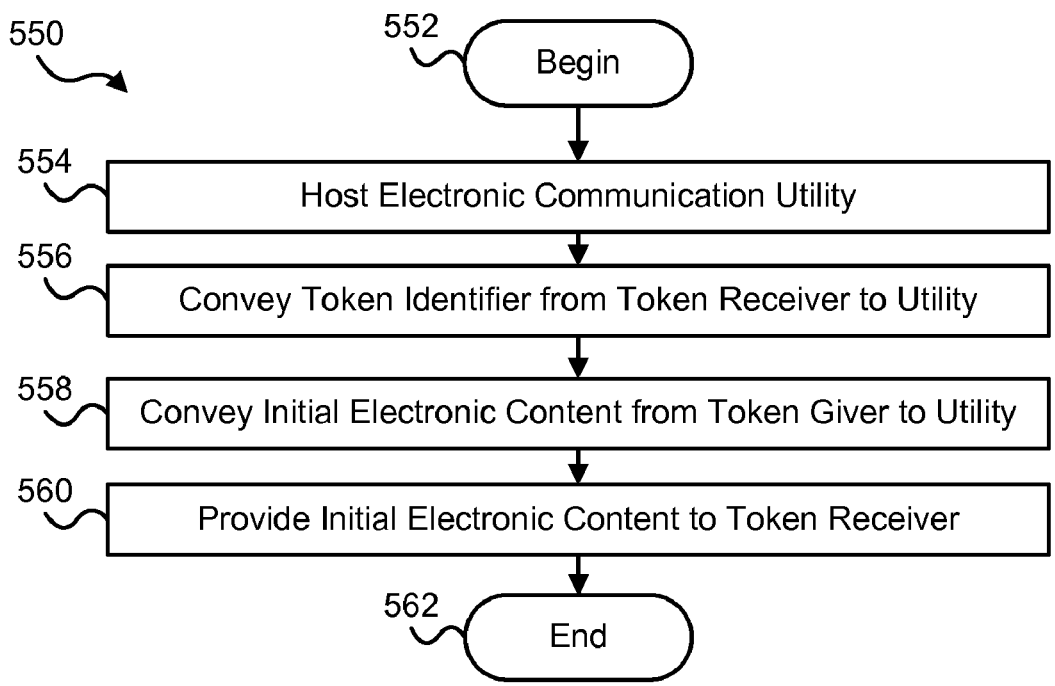
FIG. 5B is a flow chart diagram illustrating one embodiment of a method for facilitating electronic communication based on a personal contact in accordance with the present invention.

FIG. 5B is flow chart diagram illustrating one embodiment of a method 550 for facilitating anonymous electronic communication based on a personal contact. The method 550 begins 552 when a service provider hosts 554 an electronic communication utility 210.

The service may host the electronic communication utility 210 by installing the utility on a network server 212 connected to a communication network 216. Next, the service provider conveys 556 a token identifier 104 received from the token receiver 202 to the electronic communication utility 210. The service provider conveys the token identifier 104 by configuring a communication network 216 to relay a message containing the token identifier 104 from the token receiver client application 208 to the electronic communication utility 210.

Next, the service provider conveys 558 initial electronic content customized for the token identifier 104 from the token giver client application 218 to the electronic communication utility 210. The service provider provides 560 the initial electronic content to the token receiver client application 208 and the method ends 562.

Figure 6A:
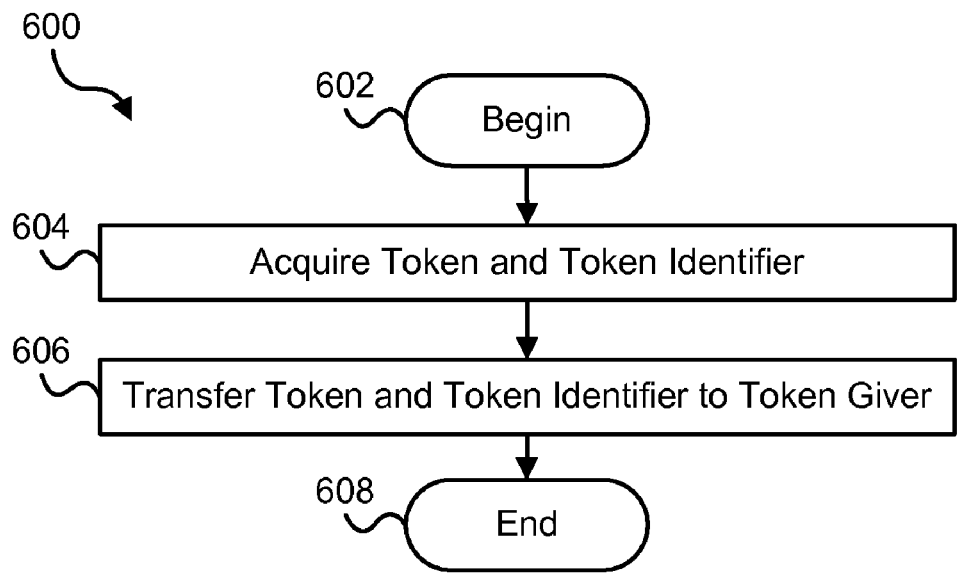
FIG. 6A is a flow chart diagram illustrating one embodiment of a method for facilitating electronic communication based on a personal contact in accordance with the present invention.

FIG. 6A is flow chart diagram illustrating one embodiment of a method 550 for distributing tokens 102. The method 600 begins 602 when a token retailer acquires 604 tokens 102 from a token vendor. The token vendor may be a token manufacturer, a token distributor, or a token wholesaler. The token vendor then transfers 606 one or more tokens 102 along with their corresponding token identifiers 104 to a token giver 204. The token vendor may transfer by selling the tokens 102 to the token giver 204 or by giving away the tokens 102. Transferring may also involve selling or giving the tokens 102 to a third party who then sells or gives the tokens 102 to the token giver 204. The method 600 ends 608.

Once tokens 102 have been distributed to a token giver 204, the electronic communication utility 210 and profile utility 220 need to be informed of the transfer.

Figure 6B:
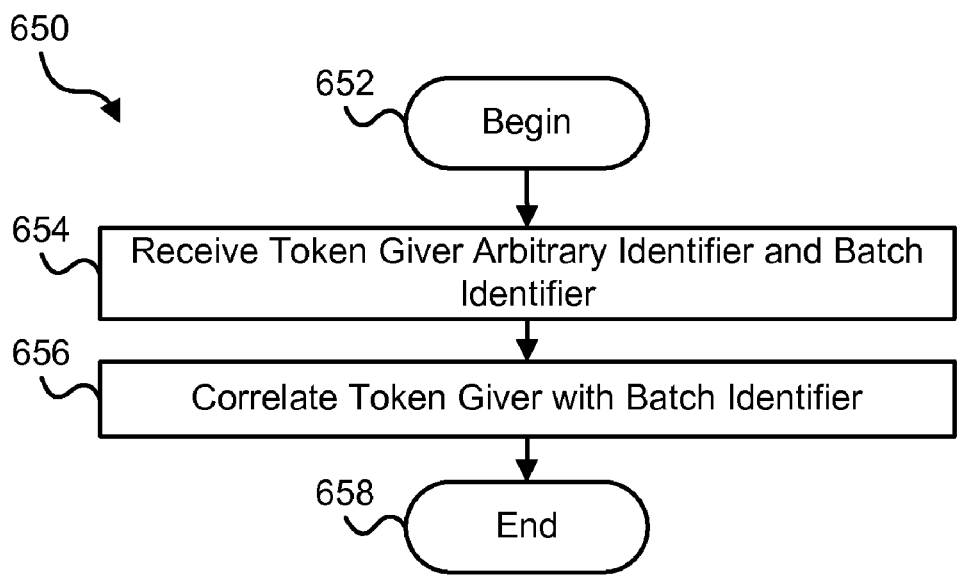
FIG. 6B is a flow chart diagram illustrating one embodiment of a method for facilitating electronic communication based on a personal contact in accordance with the present invention.

FIG. 6B is flow chart diagram illustrating one embodiment of a method 650 for informing the electronic communication utility 210 of a token distribution. The method 650 begins 652 subsequent to a token distribution, when the electronic communication utility 210 receives 654 a token giver's account identifier and a batch identifier 106. The account identifier and a batch identifier 106 may be sent to the electronic communication utility 210 by the token vendor or by the token giver 204.

The batch identifier 106 is associated with a plurality of tokens 102 transferred by the token vendor to the token giver 204. As described above in relation to FIG. 1A, each token identifier 104 includes the batch identifier 106.

In some situations, the token vendor may transfer a first set of tokens having a first batch identifier and a second set of tokens having a second batch identifier to the token giver 204. In these situations the token vendor or token giver 204 sends the token giver's account identifier and both batch identifiers to the electronic communication utility 210. In certain embodiments, the token vendor or token giver 204 may send the account identifier and batch identifier 106 to the repository 214 rather than to the electronic communication utility 210.

The account identifier may be one or more alphanumeric characters that identify an account associated with the token giver 204. For example, the account identifier may be a user name or account number. The user name or account number may be selected such that it does not disclose personal information, such as the user's true name. In this situation the user name is typically referred to as a "screen name" or "alias." Each token giver 204 may have an account identifier.

Typically, the account identifier is selected by the token giver 204. If a person who is a token receiver 202 with respect to a particular token exchange is also a token giver 204 for a different token exchange, that person may also have an account identifier since that person is already known to the apparatus 350 due to a prior situation in which that person was a token giver 202.

Next, the electronic communication utility 210 correlates 656 the batch identifier 106 with the token giver's account identifier and stores the correlation in the repository 214. Correlation may involve searching the repository 214 for the token giver's account identifier to determine if the token giver 204 is a current subscriber. Correlation may also involve associating the received batch identifier with the token giver's account identifier in the repository 214.

The electronic communication utility 210 may also associate the received batch identifier with a set of token identifiers that include the received batch identifier. The electronic communication utility 210 may consult a master list of token identifiers 104 and corresponding batch identifiers 106 to determine the set of token identifiers that include the received batch identifier. The master list may be stored in the repository 214 and may be received from a token manufacturer, token wholesaler, token distributor, or token retailer. The method 650 ends 658.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as data value programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

What is claimed is:

1. A method for facilitating electronic communication based on a personal contact, the method comprising:

receiving a token identifier from a token receiver, wherein the token identifier is uniquely associated with a token given to the token receiver through the personal contact with a token giver;

establishing an electronic communication channel between the token giver and the token receiver in response to receiving the identifier;

brokering, by way of a network server, an electronic content transfer between the token receiver and the token giver via the electronic communication channel in response to a request from one of the token receiver and the token giver; and providing, to the token receiver during the electronic content transfer, initial electronic content associated with the token identifier, the initial electronic content comprising a set of selected elements forming a profile from the token giver to be associated with the initial electronic content.

2. The method of claim 1, wherein the profile comprises a set of elements wherein each element has a type selected from the group consisting of number, text, image, audio, video, podcast, web log (blog), Really Simple Syndication (RSS), personal information, promotional code, coupon, web page and file.

3. The method of claim 1, wherein the profile comprises a promotion associated with a set of promotion conditions and wherein the method further comprises:
debiting an account associated with the token giver for the promotion in response to the token receiver satisfying the promotion conditions; and
triggering fulfillment of the promotion for the token receiver in response to the token receiver satisfying the promotion conditions.

4. The method of claim 3, wherein the promotion comprises a free product sample and the set of promotion conditions comprises providing personal information.

5. The method of claim 1, further comprising rejecting a request to broker a subsequent electronic content transfer between the token receiver and the token giver in response to a termination request from one of the token receiver and the token giver.

6. The method of claim 1, further comprising receiving context information that describes a context for the personal contact and presenting the context information to one of the token giver and the token receiver in response to user input.

7. The method of claim 1, further comprising disabling the electronic communication channel in response to receiving a termination request from one of the token receiver and the token giver and wherein the electronic communication channel restricts disclosure of personal information between the token giver and the token receiver to explicit disclosure of the personal information through the electronic communication channel by one of the token giver and the token receiver.

8. The method of claim 1, wherein the token comprises one of a virtual token and a physical token, wherein the token comprises the token identifier.

9. The method of claim 8, wherein the physical token comprises a coin-sized object.

10. The method of claim 8, wherein the physical token comprises a portable object.

11. The method of claim 1, wherein the token identifier comprises a machine-readable code.

12. The method of claim 1, wherein the token identifier is a random value.

13. The method of claim 1, wherein the token comprises one of a physical token transferred to the token receiver and a virtual token configured to be distributed electronically to the token receiver in response to the personal contact.

14. The method of claim 1, further comprising notifying the token giver in response to receiving the token identifier from the token receiver.

15. The method of claim 14, wherein notifying further comprises sending a notification selected from the group consisting of an email message, a voicemail message, an instant message, a text message, a pager message, and a notification icon.

16. The method of claim 1, further comprising in response to receiving the identifier from the token receiver, presenting an advertising message for a vendor that provided the token to one of the token receiver and the token giver.

17. The method of claim 1, wherein the electronic communication channel comprises one of an asynchronous communication channel and a synchronous communication channel.

18. The method of claim 1, further comprising:
automatically exchanging token description information between the token giver and the token receiver in response to recognizing the token receiver as a subscriber;
populating a token giver contact list with token description information of the token receiver; and
populating a token receiver contact list with token description information of the token giver.

19. A method for facilitating electronic communication based on a personal contact, the method comprising:
authenticating a token giver;
receiving a set of selected elements forming a profile from the token giver to be associated with initial electronic content associated with a token identifier designated by a token giver, wherein the token identifier is uniquely associated with a token given to a token receiver through the personal contact with the token giver;
providing the selected elements to an electronic communication utility hosted on a network server, the electronic communication utility programmed to, receive a token identifier from a token receiver;
establish an electronic communication channel between the token giver and the token receiver in response to receiving the token identifier; and
broker an electronic content transfer between the token receiver and the token giver via the electronic communication channel in response to a request from one of the token receiver and the token giver, the electronic content transfer including the initial electronic content.

20. The method of claim 19, further comprising receiving token exchange information from the token giver.

21. The method of claim 20, wherein the token exchange information comprises at least one of a name of the token receiver, a time of token exchange, a date of token exchange, a location of token exchange, a topic of conversation between token giver and token receiver, a photograph of token receiver, and notes from a conversation between token giver and token receiver.

22. The method of claim 19, wherein each selected element has a type selected from the group consisting of text, image, audio, video, podcast, web log (blog), Really Simple Syndication (RSS), personal information, promotional code, coupon, and file.

23. The method of claim 19, further comprising:
acquiring the token and the token identifier from a token vendor wherein the token identifier comprises a batch identifier and wherein the batch identifier is associated with a plurality of tokens;
transferring the token and the token identifier to the token giver;
and wherein the electronic communication utility is further programmed to:
receive both an account identifier associated with a token giver and the batch identifier; and
correlate the token giver with the received batch identifier.

24. The method of claim 23, wherein the electronic communication utility is in communication with a repository that stores the token identifier and the batch identifier and wherein correlating the token giver with the received batch identifier comprises associating the batch identifier, token identifier, and the account identifier within the repository.

25. The method of claim 23, wherein the token vendor is one of a token manufacturer, a token distributor, and a token wholesaler.

26. The method of claim 23, wherein the batch identifier is associated with a plurality of tokens.

27. The method of claim 19, further comprising configuring the electronic communication utility to provide a promotional offer to the token receiver via the electronic communication channel.

28. A method for facilitating anonymous electronic communication based on a personal contact, the method comprising:
   hosting an electronic communication utility on a network server, wherein the communication utility is programmed to;
      receive a token identifier from a token receiver, wherein the token identifier is uniquely associated with a token given to the token receiver through the personal contact with a token giver;
      establish an electronic communication channel between the token giver and the token receiver in response to receiving the identifier;
      broker an electronic content transfer between the token receiver and the token giver via the electronic communication channel in response to a request from one of the token receiver and the token giver;
   conveying the token identifier to the communication utility in response to receiving the token identifier from the token receiver;
   conveying, to the communication utility, initial electronic content customized for the token identifier by the token giver; and
   providing the initial electronic content to the token receiver.

29. A system for facilitating anonymous electronic communication based on a personal contact, the system comprising:
   an electronic communication utility comprising;
      a receiver module programmed to receive a token identifier from a token receiver, wherein the token identifier is uniquely associated with a token given to the token receiver through the personal contact with a token giver;
      a channel module programmed to establish an electronic communication channel between the token giver and the token receiver in response to receiving the identifier;
      a transfer module programmed to broker an electronic content transfer between the token receiver and the token giver via the electronic communication channel in response to a request from one of the token receiver and the token giver;
   a token receiver client application programmed to accept the token identifier from the token receiver and relay the token identifier to the electronic communication utility and to present initial electronic content provided by the electronic communication utility to the token receiver;
   a network server programmed to host the electronic communication utility;
   a repository programmed to store a first association between the token identifier and a batch identifier and a second association between the batch identifier and the token giver and to provide the first and second associations to the electronic communication utility; and
   a communication network coupling the electronic communication utility, token receiver client application, network server, and repository.

30. The system of claim 29, further comprising:
   a profile utility comprising;
      an authentication module configured to authenticate a token giver;
      a content module configured to receive a set of selected elements forming a profile; and
   a token giver client application configured to accept the set of selected elements forming a profile and provide the set to the profile utility.

31. The system of claim 29, wherein the channel module is further configured to disable the electronic communication channel in response to receiving a termination request from one of the token receiver and the token giver.

32. The system of claim 29, wherein the transfer module is further configured to restrict disclosure of personal information between the token giver and the token receiver to explicit disclosure of the personal information through the electronic communication channel by one of the token giver and the token receiver.

33. A method for facilitating electronic communication based on a personal contact, the method comprising:
   receiving a token identifier from a token giver, wherein the token identifier is uniquely associated with a virtual token electronically transmitted to the token receiver through the personal contact with the token giver, the token identifier associated with an account identifier for the token giver;
   establishing an electronic communication channel between the token giver and the token receiver in response to receiving the token identifier;
   brokering, by way of a network server, an electronic content transfer between the token receiver and the token giver via the electronic communication channel in response to a request from one of the token receiver and the token giver; and
   providing, to the token receiver during the electronic content transfer, initial electronic content associated with the token identifier, the initial electronic content comprising a set of selected elements forming a profile from the token giver to be associated with the initial electronic content.

34. The method of claim 33, wherein the electronic transmission of the virtual token is facilitated by one or more of displaying the token identifier on an electronic device of the token giver and electronically transmitting the token identifier from an electronic device of the token giver to a second electronic device of the token receiver.

35. The method of claim 34, wherein the second electronic device of the token receiver is programmed to perform one or more of reading the token identifier displayed by the token giver and receiving the token identifier transmitted electronically by the token giver.

* * * * *